United States Patent [19]

Watkins

[11] Patent Number: 4,517,735
[45] Date of Patent: May 21, 1985

[54] APPARATUS AND METHOD FOR TENSIONING RESISTIVE WIRE

[75] Inventor: Dennis W. Watkins, King County, Wash.

[73] Assignee: AirSensors, Inc., Seattle, Wash.

[21] Appl. No.: 546,368

[22] Filed: Oct. 28, 1983

[51] Int. Cl.³ .............................................. H01C 17/28
[52] U.S. Cl. ....................................... 29/621; 29/452; 29/592 R; 140/71.5
[58] Field of Search ...................... 29/452, 610 R, 618, 29/621, 623, 592 R; 140/71.6, 71.5; 338/316; 73/118 A, 204, 862.44, 862.43, 862.39

[56] References Cited

U.S. PATENT DOCUMENTS

| | | | |
|---|---|---|---|
| 3,265,276 | 8/1966 | Roffelsen | 140/71.6 |
| 3,702,566 | 11/1972 | Obermaier et al. | 73/204 |
| 3,791,901 | 2/1974 | Beauregard | 29/618 |

FOREIGN PATENT DOCUMENTS

| | | | |
|---|---|---|---|
| 147802 | 4/1981 | German Democratic Rep. | 29/592 R |
| 864989 | 4/1961 | United Kingdom | 140/71.5 |
| 2061505 | 9/1980 | United Kingdom | 73/861.22 |

Primary Examiner—Howard N. Goldberg
Assistant Examiner—P. W. Echols
Attorney, Agent, or Firm—Seed and Berry

[57] ABSTRACT

An apparatus and method for use in the attachment of a length of resistive wire under a preselected tension to wire-supporting end portions of a pair of generally parallel, resilient posts attached to a post support member. The apparatus includes a spindle for rotatably supporting a spool containing a substantially continuous supply of the resistive wire from which the length of resistive wire to be attached to the resilient posts is obtained; a brake for applying a rotational drag on the spool at least as great as the preselected tension; a gravity-actuated tension arm for applying the tension to a portion of the continuous resistive wire extending from the spool, the arm engaging the extending portion of continuous resistive wire and being supported for pivotal motion in a substantially vertical plane, the arm having an adjustable counterbalance weight for adjusting the tension applied to the preselected tension; a retainer for releasably holding the post support member to position the pair of resilient posts in a desired location and planar orientation for attachment of the length of resistive wire, the retainer including a wire index for positioning of the length of resistive wire substantially transverse to the resilient posts, and further including a lockably adjustable holder for holding the support member and selective longitudinal positioning of the wire-supporting end portions relative to the length of resistive wire; a pair of releasable wire clamps, one of the clamps being positioned to the outside of each of the posts for selectively clamping the extending portion of the continuous resistive wire; a wire guide for positioning of the length of resistive wire in substantially coplanar relation to the resilient posts; and a tension gauge for measuring the tension on the extending portion of the continuous resistive wire.

9 Claims, 7 Drawing Figures

APPARATUS AND METHOD FOR TENSIONING RESISTIVE WIRE

DESCRIPTION

This application is related to a copending application of the same inventor, Ser. No. 490,560, filed May 2, 1983.

1. Technical Field

The present invention relates generally to wire-tensioning devices, and more particularly, to an apparatus and method for tensioning resistive wire between a pair of resilient posts.

2. Background Art

It is often necessary or useful to know the mass of air flowing through a passageway. While there are many applications for an anemometer or air mass sensor, an application of particular interest is in an internal-combustion engine. For an automobile engine with electronic fuel injection and ignition systems, air mass flow into the engine is one of several important sensed conditions useful in generating an electrical signal which controls and optimizes performance of those systems.

Conventional air mass sensors utilize a temperature-dependent, resistive wire, such as platinum wire, having an electrical resistance proportional to its temperature. The resistive wire is place in the air mass flow of a passageway, and an electrical circuit supplies electric current to the wire. The circuit automatically regulates the flow of current through the resistive wire to maintain its resistance and hence its temperature constant and measures that current. The measured current (or a voltage proportional thereto) indicates the quantity of air per unit of time flowing through the passageway, and is used by the circuit to generate an air mass flow-indicating signal.

While such conventional hot-wire air mass sensors have proven advantages, when used in a harsh environment such as exists in an air induction system of an internal-combustion engine, they are frequently inaccurate, unreliable and subject to resistive wire breakage. For conventional air mass sensors utilizing a bent resistive wire, as have many sensors in the past, the wire is prone to breakage at each bend when heated during sensor operation. Typically, the resistive wire of an air mass sensor operates at temperatures around 250° C.; and at such an extremely elevated temperature, resistive wire such as platinum becomes brittle in the area of the bend and easily breaks when exposed to vibration and airflow forces. Even a straight length of heated resistive wire will frequently bend when subjected to the vibration and airflow forces encountered in an air induction system of an internal-combustion engine.

To overcome these problems, an air mass sensor has been developed which permits the positioning of a straight length of resistive wire held under tension in the central portion of a passageway of the air induction system of an internal-combustion engine, whereat a true sampling of the air mass flow through the air induction system may occur. To place the resistive wire in the central portion of the passageway and reduce the effect of fibration and airflow forces on the wire, the air mass sensor utilizes a pair of electrically conductive, resilient posts capable of withstanding the elevated operating temperatures encountered when the sensor is operating, wih the resistive wire suspended therebetween. The posts are positioned to place the wire transverse to the direction of airflow in the passageway. The resilient posts are substantially parallel and biased away from each other to hold the resistive wire under tension. The ends of the resistive wire are soldered or otherwise attached to the posts without any substantial bending of the resistive wire.

For proper operation, the resistive wire must be placed under a preselected tension and held under the tension by biasing the resilient posts away from each other. For reliable performance from one air mass sensor to another, the tension on the resistive wire must be precise and constant from one sensor to another. Preferably, the length of wire attached to the posts should not change substantially from one sensor to another. Since the resiliency of the post may vary from one to another, depending on the resiliency of the particular batch of material from which the posts are fabricated, and since the posts may be slightly bent or askew relative to each other prior to the attachment of the resistive wire thereto, there is a problem of attaching a length of the resistive wire between the posts under a preselected and constant tension in an efficient, economical, and reliable manner which is not dependent on the resiliency of the posts being used or the separation of the posts.

It will therefore be appreciated that there has been a significant need for an apparatus and method for tensioning resistive wire which will overcome the problems just discussed. The present invention fulfills this need and provides other related advantages.

DISCLOSURE OF INVENTION

The present invention is an apparatus and method for use in the attachment of a length of resistive wire under a preselected tension to a pair of resilient posts, including: holding means for holding the pair of resilient posts in a desired location and planar orientation; support means for rotatably supporting a spool containing a substantially continuous supply of the resistive wire from which the length of resistive wire to be attached to the resilient posts is obtained; brake means for applying a rotational drag on the spool greater than the preselected tension; tensioning means for applying tension to the continuous length of resistive wire, the tensioning means being adjustable to apply the preselected tension; and guiding means for guiding the continuous resistive wire to position the length of resistive wire substantially coplanar with the posts for attachment thereto.

More specifically, in the presently preferred embodiment of the invention, the support means is a spindle and the tensioning means is a gravity-actuated tension arm for applying the tension to a portion of the continuous wire extending from the spool. The tension arm engages the extending portion of the continuous resistive wire and is supported for pivotal movement in a substantially vertical plane. The tension arm has an adjustable weight for adjusting the tension applied to the preselected tension.

The holding means is a retainer for releasably holding a post support member to which the resilient posts are attached, for positioning of the posts for attachment of the length of resistive wire. The retainer includes a wire index for positioning of the length of resistive wire substantially transverse to the resilient post, and further includes a lockably adjustable holder for holding the support member and selective longitudinal positioning of the wire-supporting end portions of the posts relative to the length of resistive wire.

The retainer has a fixed first member and a second member slidably mounted thereto, the second member having means for releasably retaining the post support member and being slidable for moving the resilient posts attached to the post support member along a path substantially transverve to the length of resilient wire. The second member is lockable relative to the first member. The wire index is fixedly attached to the first member.

The apparatus further includes a pair of releasable wire clamps, one of the clamps being positioned to the outside of each of the resilient posts for selectively clamping the extending portion of the continuous wire. A tension gauge is provided for measuring the tension on the extending portion of the continuous resistive wire.

The tension arm supports at one end a longitudinally adjustable counterbalance weight for adjustment of the tension, and at an opposite end therefrom supports a freely rotatable idler sleeve engageable with the extending portion of the continuous wire to apply the preselected tension thereto. The guiding means for positioning of the resistive wire is a freely rotatable idler sheave mounted in substantially coplanar relation to the resilient posts.

In the presently preferred embodiment of the invention, the method of attaching the length of resilient wire includes: rotatably mounting the spool with a portion of the continuous resistive wire extending from the spool; applying a rotational drag to the spool at least as great as the preselected tension; applying the preselected tension to the extending wire portion with the rotational drag applied to the spool and a free end portion of the extending wire portion held fixed; holding the pair of resilient posts substantially coplanar with and substantially transverse to the extending wire portion; attaching the extending wire portion to one of the resilient posts towards the free end of the extending wire portion, and then attaching the extending wire portion to the other one of the resilient posts to form the length of resilient wire between the posts, the attachment occurring with the preselected tension applied to the extending wire portion; and, after attachment of the extending wire portion to each of the resilient posts, severing the length of resistive wire from the remainder of the extending wire portion. The method further includes releasably holding the free end portion of the extending wire portion by a clamp prior to attachment of the extending wire portion to the first of the resilient posts. Also, the extending wire portion toward the spool is releasably held by a clamp subsequent to attachment of the extending wire portion to the first of the resilient posts, the clamp holding the extending wire portion during severing of the length of resistive wire, whereby a new free end portion is formed and held by the clamp in preparation for attachment of the next length of wire to another pair of resilient posts.

Other features and advantages of the invention will become apparent from the following detailed description, taken in conjunction with the accompanying drawings.

BEST MODE FOR CARRYING OUT THE INVENTION

Figure 1:
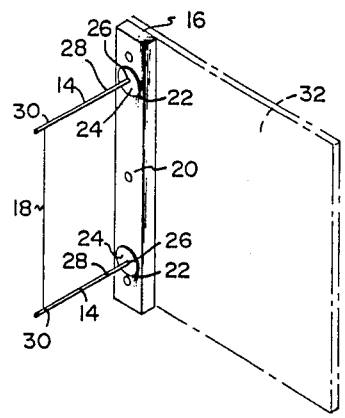
FIG. 1 is an air mass sensor fabricated using the apparatus and method of the present invention, with an associated circuit board shown in phantom.

As shown in the drawings for purposes of illustration, the present invention is embodied in an apparatus, indicated generally by reference numeral 10, for tensioning of temperature-dependent resistive wire 12 between a pair of spaced-apart resilient posts 14 of an air mass sensor 16, and a method of achieving the tensioning.

The air mass sensor 16 shown in FIG. 1, which is fabricated using the apparatus 10 and method of the present invention, includes a straight length or segment 18 of the resistive wire 12, and a rigid support plate 20 for fixedly retaining in a spaced-apart, substantially parallel relationship the pair of resilient posts 14. The support plate 20 has a pair of spaced-apart openings 22 therethrough and a pair of electrically nonconductive support inserts 24 disposed within the openings. A central aperture 26 in each of the inserts 24 is sized to receive and firmly grip an end portion 28 of one of the resilient posts 14. Each post has an opposite wire-supporting end portion 30 to which the straight length 18 of resistive wire 12 is attached by soldering or other suitable means, preferably without significant bending of the wire. An associated circuit board 32 is shown in phantom in FIG. 1 for mounting of circuitry (not shown).

The resistive wire 12 is preferably 99.99% pure, hard platinum wire of 0.003 inch diameter, with a tensile strength of 0.4 pounds, and the straight length 18 of the wire extending between the posts 14 is typically 0.8–1.6 inches in length for automotive applications. The resilient posts 14 may be manufactured of 0.032-inch diameter, straight stock, phosphorus bronze spring wire. The spring wire provides the necessary resiliency so the posts can flex somewhat under the forces encountered during operation of the air mass sensor and dampen out vibrations and movements of the attached length 18 of resistive wire 12. The use of such material for the resilient posts 14 also provides the capability to withstand the temperature of the airflow in an air induction system of an internal-combustion engine, and the elevated operating temperature of the length 18 of resistive wire 12 during heating of the wire, while maintaining a preselected tension on the wire. The electrical current used to heat the length 18 of resistive wire 12 is conducted through the resilient posts 14, and typical air mass sensor-related circuitry (not shown) will supply from 0.5 to 1.5 amperes of current to the resistive wire. The support plate 20 may be manufactured of a lightweight, high-strength alloy, such as aluminum.

Figure 2:
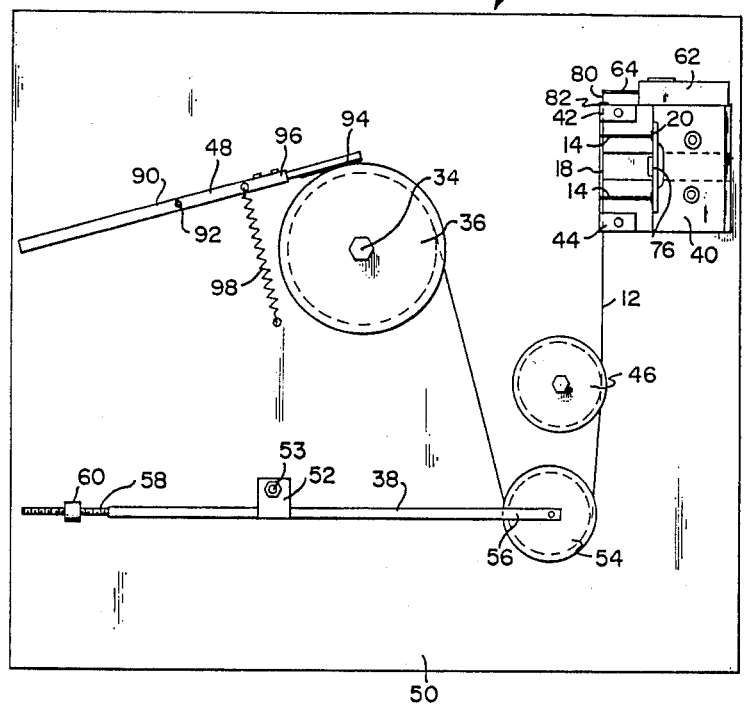
FIG. 2 is a tensioning apparatus embodying the present invention for tensioning resistive wire between the resilient posts of the air mass sensor of FIG. 1.

As shown in FIG. 2, the apparatus 10 of the present invention includes a freely rotatable spindle 34 for supporting a spool 36 of the resistive wire 12 of substantially continuous length, an adjustably weighted tensioning arm 38 for applying a preselected tension to the resistive wire, a jig 40 for holding the support plate 20 with the pair of resilient posts 14 retained thereby in place for affixing of the length 18 of resistive wire 12, a pair of selectively operable first and second wire clamps 42 and 44 positioned outside of the pair of posts when held by the jig, and a grooved guide wheel or sheave 46 for alignment of the resistive wire with the posts. A brake 48 is also provided to prevent free-rolling of the spool 36 on the spindle 34 and cooperate with the application of tension to the resistive wire 12. The above-described components of the wire-tensioning apparatus 10 are mounted on a frame 50, which may be a vertically oriented frame plate.

More specifically, the tensioning arm 38 is pivotally mounted to the frame 50 for movement in a vertical plane by a flange 52 rigidly attached to the arm along the midportion of the arm and pivotally attached to the frame at a pivot point 53. A grooved wheel or sheave 54 for carrying the resistive wire 12 is rotatably attached to an end portion 56 of the tensioning arm 38 and oriented co-planar with the rotation of the arm. At an opposite end portion 58 of the tensioning arm 38, on an opposite side of the arm's pivot point 53, is a longitudinally adjustable weight 60. The weight 60 has interior threads which correspond to exterior threads on the threaded end portion 58 of the tensioning arm 38 to allow the longitudinal positioning of the weight along the arm by rotation of the weight relative to the arm. The spool 36 containing the continuous resistive wire 12 is mounted on the spindle 32, and the wire is fed off the spool, and under and then partially around the tensioning arm sheave. The guide sheave 46 is positioned above the tensioning arm sheave 54 to provide proper alignment of the wire as it comes off the tensioning arm sheave in preparation for its attachment to the resilient posts 14. The guide and tensioning arm sheaves 46 and 54 are freely rotatable idler sheaves. The jig 40 is positioned above the guide sheave 46 to hold both of the pair of resilient posts 14 in a position transverse to the resistive wire 12 coming off the guide sheave passes. A tension gauge 62 is mounted above the jig 40 and has a protruding arm 64 to which the resistive wire 12 may be attached for measuring of the tension on the wire.

Figure 3:
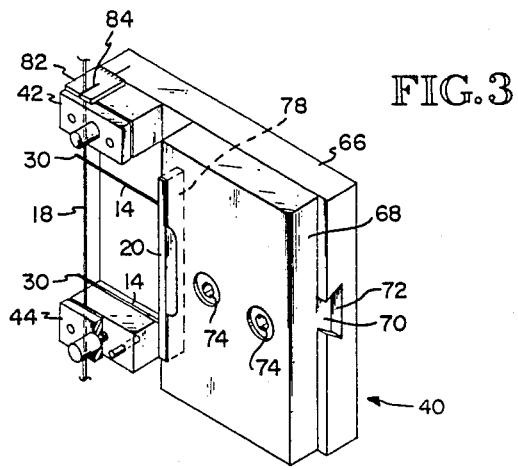
FIG. 3 is an enlarged, fragmentary, isometric view of a jig of the tensioning apparatus of FIG. 1 shown holding the resilient posts of the sensor in position for attachment of a length of resistive wire.

As best shown in FIG. 3, the jig 40 includes a base plate 66 rigidly attached to the frame 50, and a slidable clamping plate 68 slidably mounted to the base plate. The clamping plate 68 has a horizontally extending key 70 which projects towards the base plate 66 and is retained within a horizontally extending keyway 72 of the base plate sized to receive and retain the key to permit the clamping plate to be slid horizontally relative to the base plate but otherwise retained. A pair of lock screws 74 are provided for locking the clamping plate 68 to the base plate 66 in a selected position.

The jig 40 also has a pressure clip 76 carried by the clamping plate 68 to rigidly hold the support plate 20 of the air mass sensor 16 to the clamping plate for movement therewith, the resilient posts 14 being held with a horizontal orientation substantially transverse to the resistive wire 12. Movement of the clamping plate 68 permits selective longitudinal positioning of the resistive wire 12 relative to the wire-supporting end portions 30 of the pair of resilient posts 14 in preparation for affixing of the length 18 of resilient wire. The sliding clamping plate 68 has a shoulder 78 sized to receive the support plate 20 and positioned to hold it away from the frame 50 such that the pair of resilient posts 14 will have the same planar orientation as the resistive wire 12 extending from the guide sheave 46.

The tension gauge 62 is positioned above the jig 40 with its arm 64 positioned for attachment to a free end 80 of the continuous resistive wire 12. The first clamp 42 is rigidly mounted on the base plate 66 of the jig 40 above the uppermost one of the resilient posts 14 of the air mass sensor 16 being held by the jig, and below the point of attachment of the free end 80 of the resistive wire to the tension gauge 62. The second clamp 44 is rigidly mounted on the base plate 66 below the lowermost one of the resilient posts 14. The first and second clamps 42 and 44 are block clamps which selectively engage and hold the resistive wire 12 away from the base plate 66 substantially in position for its attachment to the wire-supporting end portions 30 of the resilient posts 14. The use of the clamps will be described more fully below.

Positioned above the first clamp and attached thereto is a wire guide 82. The guide 82 has a slot 84 to receive the resistive wire 12 for alignment of the resistive wire transverse to the wire-supporting end portions 30 of the resilient posts 14 in preparation for attachment of the resistive wire to the posts.

The brake 48 comprises a brake arm 90 pivotally attached to the frame 50 at a pivot point 92, with a brake pad 94 attached at an end 96 of the brake arm for engagement with the rim of the spool 36 to provide frictional drag against rotation of the spool. The brake pad 94 is held firmly against the spool 36 by a tension spring 98 attached by its one end to the brake arm 90 at a position between the pivot point 92 and the brake pad, and attached by its other end to the frame 50.

Figure 4:
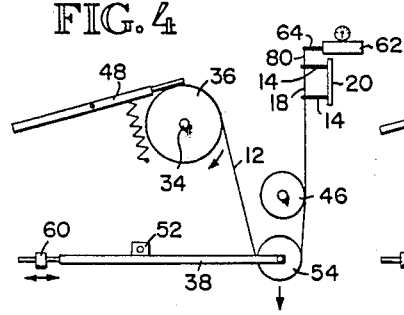
FIG. 4 is a schematic drawing of the apparatus shown in FIG. 2 in operation showing an initial step of applying tension to the resistive wire.
Figure 5:
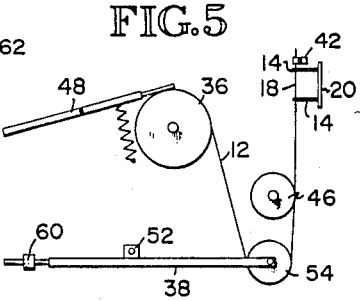
FIG. 5 is a schematic drawing of the apparatus shown in FIG. 4 showing a subsequent step of clamping and attaching the tensioned wire to one of the resilient posts.

The operation of the apparatus 10 of the present invention is illustrated schematically and sequentially by FIGS. 4–7. Initially, the support plate 20, retaining the pair of resilient posts 14 to which the length 18 of the resistive wire 12 is to be attached, is positioned by use of the jig 40 in the position shown in FIG. 4 (for purposes of clarity, the jig is not illustrated). In FIG. 4, the spool 36 is shown mounted on the spindle 34 and the continuous resistive wire 12 is shown threaded under and around the tensioning arm sheave 54 and past the guide sheave 46, with its free end 80 attached to the arm 64 of the tension gauge 62. Prior to attachment of the resistive wire 12 to the arm 64, the wire is positioned transverse to the resilient posts 14 by use of the wire guide 82. The brake pad 94 provides a sufficient drag that once the wire 12 is in the position shown, the action of the tensioning arm 38 will not pull any significant additional amount of resistive wire from the spool 36, but yet allows the operator of the apparatus to manually pull additional wire from the spool when setting the apparatus up for fabrication of the next air mass sensor.

With the free end 80 of the resistive wire 12 attached to the tension gauge 62 and the brake 48 applied to the spool 36, the tensioning arm 38 applies a downward force to the resistive wire as a result of the weight of the tensioning arm and its sheave 54. The adjustable weight 60 at the end portion 58 of the tensioning arm 38 remote from the sheave 54 serves as a counterbalance and permits fine adjustment of the tension the tensioning arm applies to the resistive wire 12. The adjustable weight 60 may be adjusted until the desired tension is present on the resistive wire 12, as indicated by the tension gauge 62. It is noted that the tension on the wire is independent of the position of the resilient posts relative to each other and the resiliency or bend of the particular posts to which the length 18 of resistive wire 12 is being attached.

When the tensioning arm 38 has been adjusted to place the resistive wire 12 under the desired preselected tension, usually about 3.5 grams for the type of resilient posts 14 and resistive wire 12 discussed above, as shown in FIG. 5, the next step is to clamp the wire with the first clamp 42, thereby isolating the wire from the tension gauge 62 while maintaining the tension on the wire. Then, the resistive wire is soldered or otherwise attached to the uppermost one of the resilient posts 14 being held in position by the jig 40. Thereafter, the first clamp 42 may be released, if desired, with the calibrated downward force of the tensioning arm 38 continuing to hold the resistive wire 12 under the preselected tension, as indicated by the tension gauge 62.

Figure 6:
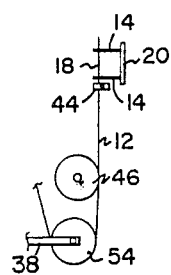
FIG. 6 is a fragmentary schematic drawing of the apparatus of FIG. 4 showing a next step of attaching the tensioned wire to the other one of the resilient posts and clamping of the wire.
Figure 7:
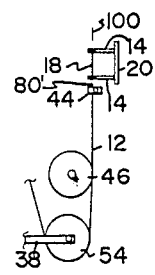
FIG. 7 is a fragmentary schematic drawing of the apparatus of FIG. 4 showing a final step of severing the loose ends of the length of the resistive wire attached between the resilient posts.

As shown in FIG. 6, the next step is to solder or otherwise attach the resistive wire 12 to the lowermost one of the resilient posts, while the wire is held under tension by the tensioning arm 38, producing the preselected tension on the length 18 of resistive wire extending between the pair of resilient posts 14. Next, the resistive wire 12 is clamped with the second clamp 44. The clamping holds the resistive wire 12 during the final step shown in FIG. 7 of cutting the resistive wire immediately to each side of the resilient posts 14, producing a small scrap end 100 of wire which is saved for reprocessing due to the high cost of platinum, and a new free end 80', which is held in place by the second clamp 44. If desired, prior to application of the second clamp 44, the tension on the continuous length of resistive wire 12 may be removed by manually lifting the tensioning arm 38 slightly.

The air mass sensor 16 is now completely fabricated and may be removed from the jig 40. The second clamp 44 continues to hold the new free end 80' of the continuous length of resistive wire 12 in place on the apparatus 10 for fabricating the next air mass sensor 16 and avoids allowing the free end of the resistive wire to move about and the wire to fall away from the guide and tensioning arm sheaves 46 and 54. It is noted that once the adjustable weight 60 is set for the desired preselected tension, it need not be reset for every air mass sensor 16 being fabricated using the same tension on the length 18 of resistive wire 12. In which case, the step of attaching the resistive wire 12 to the tension gauge 62 is not employed, and the first clamp 42 is used to clamp the resistive wire 12 with the desired preselected tension applied to the wire by the tensioning arm 38 which has already been set. The tension the apparatus 10 applies should be periodically checked, however, to insure a proper setting has been maintained.

It will be appreciated that, although a specific embodiment of the invention has been described herein for purposes of illustration, various modifications may be made without departing from the spirit and scope of the invention. Accordingly, the invention is not limited except as by the appended claims.

I claim:

1. An apparatus for use in the attachment of a length of resistive wire under a preselected tension to wire-supporting end portions of a pair of generally parallel, resilient posts attached to a post support member, comprising:
   a spindle for rotatably supporting a spool containing a substantially continuous supply of said resistive wire from which said length of resistive wire to be attached to said resilient posts is obtained;
   a brake for applying a rotational drag on said spool at least as great as said preselected tension;
   a gravity-actuated tension arm for applying said tension to a portion of the continuous resistive wire extending from said spool, said arm engaging the extending portion of continuous resistive wire and being supported for pivotal motion in a substantially vertical plane, said arm having an adjustable weight for adjusting said preselected tension applied to the wire;
   a retainer for releasably holding said post support member to position said pair of resilient posts in a desired location and planar orientation for attachment of said length of resistive wire, said retainer including a first wire guide for positioning of said length of resistive wire substantially transverse to said resilient posts, and further including a lockably adjustable holder for holding said support member and selective longitudinal positioning of said wire-supporting end portions relative to said length of resistive wire;
   a pair of releasable wire clamps, one of said clamps being positioned to the outside of each of said posts for selectively clamping said extending portion of said continuous resistive wire;
   a second wire guide for positioning of said length of resistive wire in substantially coplanar relation to said resilient posts; and
   a tension gauge for measuring the tension on said extending portion of said continuous resistive wire.

2. The apparatus of claim 1 wherein said tension arm has a wire-engaging end portion and a weighted end portion with a pivot point therebetween, said weighted end portion supporting said adjustable weight, said adjustable weight being a counter-balance weight longitudinally movable along said weighted end portion of said tension arm to set said preselected tension.

3. The apparatus of claim 2 wherein said wire-engaging end portion of said tension arm supports a freely rotatable idler sheave engageable with said extending portion of continuous resistive wire to apply said preselected tension thereto.

4. The apparatus of claim 1 wherein said second wire guide is a freely rotatable idler sheave engageable with said extending portion of continuous resistive wire and mounted in substantially coplanar relation to said resilient posts.

5. The apparatus of claim 1 wherein said retainer of said post support member has a fixed first member and a second member slidably mounted to said first member, said second member having means for releasably retaining said post support member and being slidable for moving said resilient posts attached to said post support members along a path substantially transverse to said length of resistive wire, said second member further being lockable relative to said first member.

6. The apparatus of claim 5 wherein said first wire guide is in fixed relative relation to said first member.

7. A method for the attachment of a length of resistive wire under a preselected tension to a pair of resilient posts, said length of resistive wire being obtained from a spool containing a substantially continuous supply of said resistive wire, comprising:
- rotatably mounting said spool with a portion of the continuous resistive wire extending from said spool;
- applying a rotational drag to said spool at least as great as said preselected tension;
- applying said preselected tension to the extending wire portion with said rotational drag applied to said spool and a free end portion of said extending wire portion held fixed;
- holding said pair of resilient posts substantially coplanar with and substantially transverse to said extending wire portion;
- attaching said extending wire portion to one of said resilient posts toward said free end of said extending wire portion, and then attaching said extending wire portion to the other one of said resilient posts to form said length of resistive wire between said posts, the attachment occurring with said preselected tension applied to said extending wire portion; and
- after attachment of said extending wire portion to each of said resilient posts, severing said length of resistive wire from the remainder of said extending wire portion.

8. The method of claim 7 wherein said free end portion of said extending wire portion is releasably held by a clamp prior to attaching said extending wire portion to the first of said resilient posts.

9. The method of claim 9 wherein said extending wire portion toward said spool is releasably held by a clamp subsequent to attachment of said extending wire to the first of said resilient posts, said clamp holding said extending wire during severing of said length of resistive wire, whereby a new free end portion is formed and held by said clamp in preparation for attachment of the next length of wire to another pair of resilient posts.

* * * * *

UNITED STATES PATENT AND TRADEMARK OFFICE
CERTIFICATE OF CORRECTION

PATENT NO. : 4,517,735
DATED : May 21, 1985
INVENTOR(S) : Dennis W. Watkins

It is certified that error appears in the above—identified patent and that said Letters Patent is hereby corrected as shown below:

In column 10, line 13, please substitute the following:

--The method of claim 7--., instead of "The method of claim 9."

Signed and Sealed this

Nineteenth Day of November 1985

[SEAL]

*Attest:*

*Attesting Officer*

DONALD J. QUIGG

Commissioner of Patents and Trademarks